UNITED STATES PATENT OFFICE.

WILLIAM J. COURTS, OF REIDSVILLE, NORTH CAROLINA.

FERTILIZER.

SPECIFICATION forming part of Letters Patent No. 281,840, dated July 24, 1883.

Application filed November 20, 1882. (No specimens.)

To all whom it may concern:

Be it known that I, W. J. COURTS, a citizen of the United States, residing at Reidsville, in the county of Rockingham and State of North Carolina, have invented a certain new and useful composition of matter to be used in the growth of fine yellow tobacco, cotton, grass, and cereals generally.

My composition consists of the following ingredients, combined in the proportions stated, namely: dissolved raw bone, six hundred and sixty-eight pounds; sulphate of ammonium, seventy-five pounds; sulphate of aluminium, two pounds; sulphate of iron, two pounds; sulphate of magnesium, one hundred pounds; sulphate of potash, two hundred pounds; nitrate of soda, seventy-five pounds; kainit, two hundred pounds; humus or rich dirt, six hundred and seventy-eight pounds; total, two thousand pounds. All the lumps in these ingredients are to be thoroughly pulverized, by crushing with a hammer, hoe, or other suitable implement, and intimately mixed with each other and with the bone and dirt by shoveling all together on a barn-floor, then put into sacks, barrels, or bags, and it is ready for use.

The above composition contains, therefore, the following elements, in the proportions above stated, namely: bone-meal, four hundred pounds; water, two hundred and fourteen pounds; sulphuric acid, four hundred and twelve and one-fourth pounds; nitric acid, three hundred and ninety-three and three-fourths pounds; muriatic acid, twenty-seven and one-half pounds; aluminium, two-thirds of a pound; ammonium, twenty-six and one-fourth pounds; iron, one-third of a pound; magnesium, fifty-two and one-half pounds; potassium, one hundred and twenty-two and one-half pounds; sodium, twenty-six and one-fourth pounds; humus or rich dirt, six hundred and seventy-eight pounds.

In using the above-named composition the land should be well broken up with the plow and harrowed well, then the fertilizer is drilled in the row previously laid off with the shovel-plow, at the rate of a single handful to four steps, then bed on the furrow with a turning-plow and plant such crop as is desired.

By the use of the above composition the crop is quickly started, rapidly hastened in its growth, and early matured, causing tobacco to yellow on the hill, cotton to boll well, and grain to have large heads and rich plump seeds.

What I claim, and desire to secure by Letters Patent, is—

The herein-described composition of matter or fertilizer to be used in agriculture for the raising of fine yellow tobacco especially, and for cotton crop and the cereals generally, consisting of dissolved raw bone, sulphates of aluminium, of ammonium, iron, magnesium, and potash, nitrate of soda, kainit, and humus or rich dirt, in the proportions specified.

In testimony whereof I have hereunto signed my name in the presence of two witnesses.

W. J. COURTS.

Witnesses:
J. M. COX,
H. P. WHARTON.